March 31, 1931.  H. W. JEWELL  1,798,205
UNDERGROUND CONDUIT
Filed Dec. 28, 1927
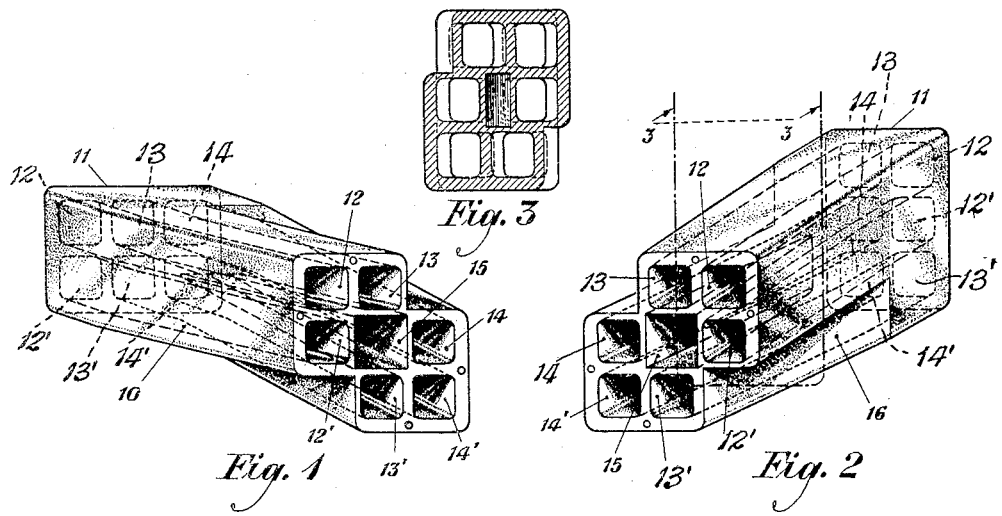
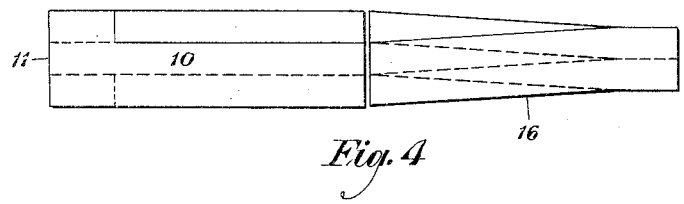
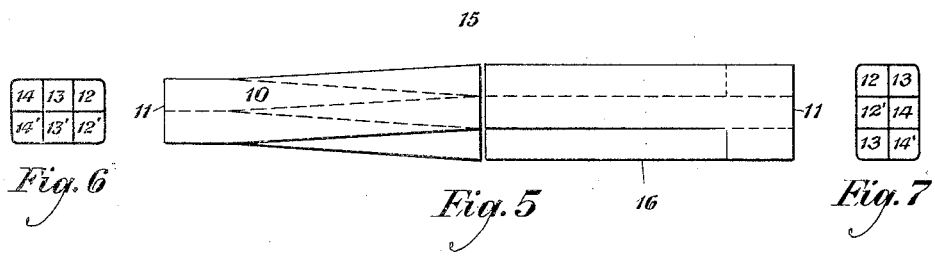
INVENTOR.
H. W. Jewell
BY
ATTORNEY Patented Mar. 31, 1931

1,798,205

UNITED STATES PATENT OFFICE

HOWARD W. JEWELL, OF LOS ANGELES, CALIFORNIA

UNDERGROUND CONDUIT

Application filed December 28, 1927. Serial No. 243,112.

This invention relates to a method of and means for transposing the multiple ducts of conduit sections to change the lateral and vertical formation of an underground conduit line.

In multiple duct conduit construction units comprising sections having six ducts are frequently employed to form a line of conduit extending longitudinally between manholes or other terminating points. A line of conduit comprising these sections of six duct multiple may be laid with the ducts lying in a two-duct wide, three-duct high formation, or with the ducts lying a three-duct wide, two-duct high formation. The space in which a conduit line is laid is sometimes restricted in area both in width and height at various points throughout the course the conduit line takes. The restriction in area may be caused by subsurface structures of other utilities, such as conduits, gas and water pipes or like obstructions. At such points, it is desirable to change the width or the height formation of the duct sections comprising the conduit line, as the case may require, to permit the sections of the conduit line to be laid advantageously. For instance, in case the conduit line encounters a narrow area, the two-duct wide, three-duct high formation of conduit section may be laid, and, in the case of an area where the height is restricted, the sections may be changed about so that a three-duct wide, two-duct high formation is presented.

It is an object of this invention to transpose the ducts of multiple conduit sections to permit changing a conduit line from a two-duct wide, three-duct high formation to a three-duct wide, two-duct high formation, or vice versa, without affecting the continuity of the ducts of the conduit line.

Another object consists in the transposition of the multiple ducts in a conduit section for this purpose in a simple and inexpensive manner.

Other and further objects will be apparent from the following description, when considered in connection with the accompanying drawing, in which one embodiment of the invention is illustrated.

In the drawing, in which like characters of reference designate like parts throughout, Figures 1 and 2 are perspective views of two companion multiple conduit sections, which are adapted to be joined to each other to effect the desired transposition of the sections of multiple conduit ducts; Fig. 3 is a section on the line 3, 3 of Fig. 2; Fig. 4 is a longitudinal top view of the conduit sections illustrated in Figs. 1 and 2 in joint relation; Fig. 5 is a side elevation of Fig. 4; Fig. 6 is an elevation taken at the left end of Fig. 5, and Fig. 7 is an elevation taken at the right end of Fig. 5.

The conduit sections outlined in this invention, and presently to be described in detail, may be made from some such substance as fire clay which in its green state is formed by dies or other suitable means into the desired shape by a well-known process and then vitrified.

Referring to the drawing, the numeral 10 represents a section of conduit divided into six ducts. These ducts extend longitudinally from the end 11 to the opposite end of the section and are positioned in vertical parallel pairs 12—12', 13—13' and 14—14'. The conduit section 10 at its end 11 comprises a portion of normal shape having ducts arranged in a two-duct high and three-duct wide symmetrical formation. The conduit 10 is deformed a short distance from the end 11 so that the major portion thereof becomes unsymmetrical, as more clearly illustrated in Fig. 1. The deformation of the section 10 is produced by any suitable means, for instance, by the insertion of piano wires through the dowel-pin holes of a section while in its plastic or green state. The piano wires may be inserted in the dowel-pin holes and drawn through the webs, which form the walls or partitions between the ducts, to divide them into split portions of equal thickness. The portion of the section thus divided which comprises the ducts 12—12' and 13 is then lifted with respect to their companion ducts 13', 14' and 14 a distance amounting to the height of half a duct. The ducts 13', 14' and 14 are at the same time depressed an equal distance so that the sum of the displacement of each of the series of ducts equals the height of one duct. When the conduit section 10 is in its adjusted position, its contiguous portions are pressed together to cause them to coalesce, said section is then dried and burned in the usual manner. The ducts 12 and 13 will be in horizontal alinement with each other when adjusted, and will extend above the other parts of the conduit section. The ducts 12' and 14, and also the ducts 13', 14' will lie in respective horizontal planes. An orifice 15 in the general form of an elongated pyramid is provided between the ducts 12' and 14 by the adjustment of the conduit section 10. The orifice 15 extends in a horizontal plane inwardly from the deformed end of the conduit section 10 to a point near the left or normal formed end 11 of said section.

A second conduit section 16 cooperates with the conduit section 10 in the transposition of a six-way conduit line from a two-duct wide, three-duct high formation to a three-duct wide, two-duct high formation, or vice versa. The section 16 is identical to the section 10, but in joining the two sections together, to bring about the desired transposition of the ducts, the section 16 is reversed with respect to the position in which the section 10 is shown. When the sections 10 and 16 are in joined position, the deformed ends of each section will be in contiguous relation. The section 16 is also rotated 90° with respect to the section 10 so that coinciding ducts and continuous longitudinal alinement of the ducts is provided between the two sections.

It will be apparent that by means of the above described invention a three-duct wide, two-duct high formation of conduit line may be readily changed to a two-duct wide, three-duct high formation, or vice versa. It will be also apparent that the formation of the conduit line may be changed as often as required.

What is claimed is:

1. In a multiple duct conduit line, the combination of two multiple duct conduit sections, each section having ducts uniformly arranged to form a symmetrical portion at one end and having certain of said ducts raised with respect to their companion ducts from their uniform position to form a deformed portion at the other end of the section, said deformed portions being adapted to be joined in opposite vertical positions with respect to each other to present coinciding ducts and to transpose the position of the ducts in the symmetrical portion of one section into a different position in the symmetrical portion of the associated section, whereby the conduit line will be changed longitudinally from a position of the ducts of the sections lying in a horizontal direction to a position of the ducts lying in a vertical direction.

2. In a multiple duct conduit line, the combination of two multiple duct conduit sections, each section having ducts uniformly arranged to form a symmetrical portion at one end and having certain of said ducts raised with respect to their companion ducts from their uniform position to form a deformed portion at the other end of the section, said deformed ends being adapted to be joined in opposite vertical positions with respect to each other to present coinciding ducts and to transpose said ducts, whereby one section will be connected to the conduit line in a three-duct wide, two-duct high formation and the other section will be connected to said conduit line in a two-duct wide, three-duct high formation.

3. In a multiple duct conduit line, the combination of a plurality of multiple duct conduit sections having one end symmetrical and the other end deformed, said deformed portions being adapted to cooperate to present coinciding ducts and thus effect a transposition of the ducts in the symmetrical end portion of one section into a different position in the symmetrical end portion of another section.

4. In a multiple duct conduit line, the combination of a multiple duct conduit section having one of its end portions arranged in a three-duct wide, two-duct high formation and having its other end deformed, and a multiple duct section adapted to cooperate with said first section and having a deformed end and having its other end portion arranged in a two-duct wide, three-duct high formation.

In testimony whereof, I have signed my name to this specification this 21st day of December, 1927.

HOWARD W. JEWELL.